United States Patent [19]

Marek

[11] Patent Number: 5,618,989
[45] Date of Patent: Apr. 8, 1997

[54] ACCELERATION SENSOR AND MEASUREMENT METHOD

[75] Inventor: Jiri Marek, Reutlingen, Germany

[73] Assignee: Robert Bosch GmbH, Stuttgart, Germany

[21] Appl. No.: 526,289

[22] Filed: Sep. 11, 1995

[30] Foreign Application Priority Data

Sep. 15, 1994 [DE] Germany ............................ 44 32 837.0

[51] Int. Cl.⁶ .................................................... G01P 15/08
[52] U.S. Cl. ........................................ 73/1.38; 73/514.32
[58] Field of Search ........................ 73/507, 1 D, 514.01, 73/514.16, 514.18, 514.21, 514.23, 514.24, 514.32, 514.36

[56] References Cited

U.S. PATENT DOCUMENTS

| | | | |
|---|---|---|---|
| 5,337,606 | 8/1994 | Bennett | 73/514.32 |
| 5,345,824 | 9/1994 | Sherman | 73/514.32 |
| 5,351,519 | 10/1994 | Kress | 73/1 D |
| 5,465,604 | 11/1995 | Sherman | 73/514.18 |
| 5,511,420 | 4/1996 | Zhao | 73/514.18 |

FOREIGN PATENT DOCUMENTS

| | | |
|---|---|---|
| 4133426 | 4/1993 | Germany . |
| WO92/03740 | 3/1992 | WIPO . |

*Primary Examiner*—Christine K. Oda
*Attorney, Agent, or Firm*—Kenyon & Kenyon

[57] ABSTRACT

An acceleration sensor has a seismic mass having movable electrodes. The movable electrodes are designed as differential capacitors between two fixed electrodes. Also provided are additional electrodes which are arranged opposite movable electrodes or opposite bending elements on which the seismic mass is suspended. Electrical voltages which are evaluated by the evaluation circuit as acceleration can be applied to the additional electrodes.

10 Claims, 2 Drawing Sheets

ACCELERATION SENSOR AND MEASUREMENT METHOD

FIELD OF THE INVENTION

The present invention relates to an acceleration sensor and a method of operating an acceleration sensor.

BACKGROUND INFORMATION

PCT International Application No. WO 92/03740 describes an acceleration sensor in which a seismic mass is provided which can be deflected by an acceleration. The seismic mass has movable electrodes which are arranged opposite fixed electrodes. The fixed electrodes and the movable electrodes form capacitances which are designed as differential capacitances.

Furthermore, in addition to this publication, an electrical positional control is known which holds the seismic mass essentially in its initial position. For this purpose, voltages which hold the seismic mass in the initial position are applied to the electrodes. The voltage which is necessary to hold the seismic mass in its rest position is then evaluated as a signal for the acceleration.

German Patent Application No. 41 33 426 describes an acceleration sensor in which, in addition to a measuring capacitance, an additional measuring capacitance is provided which is used for a self-testing of the sensor.

SUMMARY OF THE INVENTION

The sensor according to the present invention has the advantage that a self-testing of the sensor is also possible during the normal measuring operation of the sensor. In this way, it can be determined whether the occurrence of an acceleration signal is a true measured value or a defective functioning of the sensor or of the evaluating electronics. Such a method is desirable, in particular, for safety-relevant applications of the acceleration sensor.

The use of a positional control is particularly advantageous since the dynamic range and the measurement accuracy of the sensor is increased in this way. The sensor element is produced particularly easily as a result of the use of a seismic mass and electrodes in surface micromechanics.

DETAILED DESCRIPTION

Figure 1:
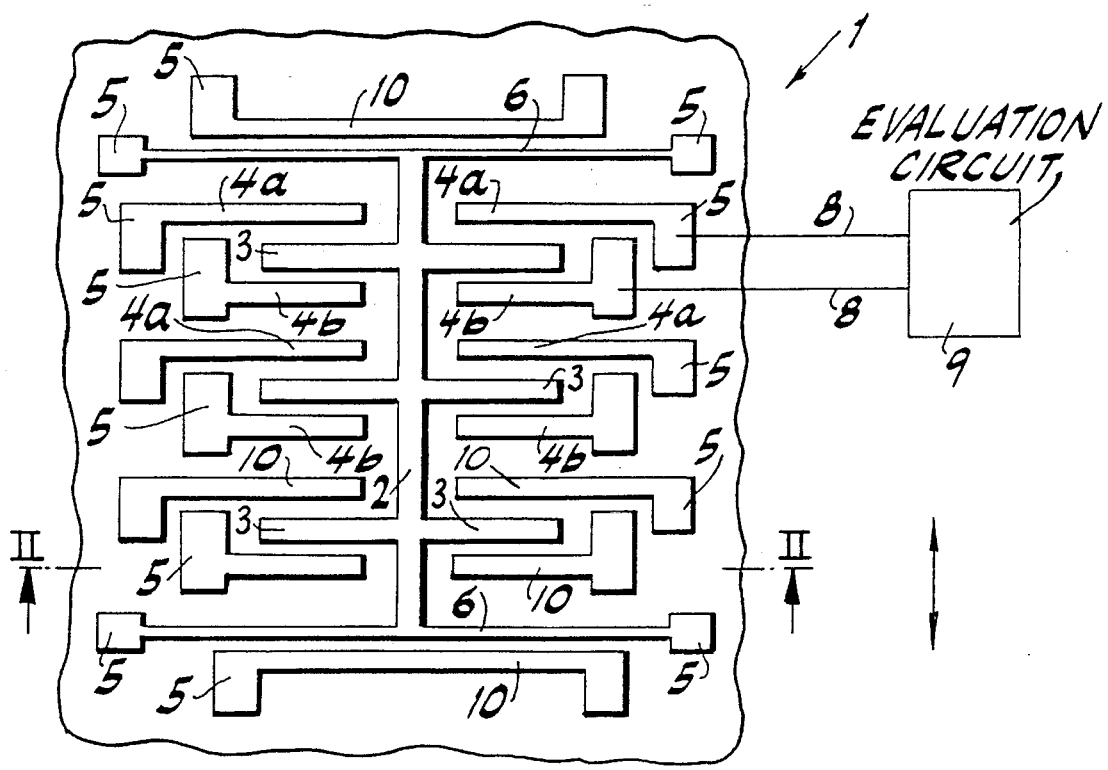
FIG. 1 shows a plan view of a sensor element according to the present invention.

FIG. 1 shows a plan view of a substrate 1 on which an acceleration sensor is arranged. The acceleration sensor has a seismic mass 2 which is suspended on thin bending arms 6 on bearing blocks 5 in such a way that the seismic mass 2 can be deflected by an acceleration which is parallel to the surface of the substrate 1 (see bidirectional arrow in FIG. 1). This acceleration is detected capacitively by structuring movable electrodes 3 out of the seismic mass 2, which electrodes are arranged opposite fixed electrodes 4a and 4b. The movable electrodes 3 and the fixed electrodes 4a and 4b each therefore form two plate capacitors whose capacitance depends on the spacing of the electrodes. The deflection of the seismic mass 2 or the acceleration can therefore be determined by measuring the capacitance between the movable electrodes 3 and the fixed electrodes 4a and 4b.

Figure 2:
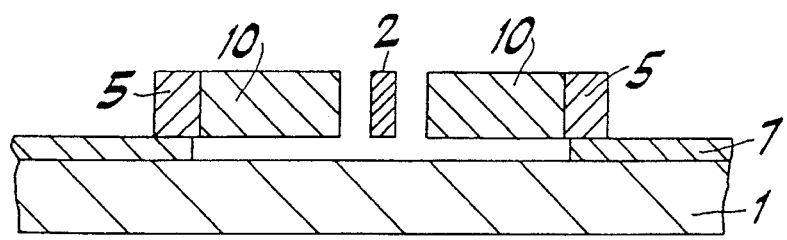
FIG. 2 shows a cross section along the line II—II of FIG. 1.

As can be seen from FIG. 2, the movable electrodes 3 are each arranged between two fixed electrodes 4a and 4b. At the same time, the fixed electrodes 4a and 4b are each suspended on separate bearing blocks 5 which are mutually insulated. This arrangement consequently provides a differential capacitor arrangement, i.e. the movable electrode 3 in each case forms a capacitor with the two fixed electrodes 4a and 4b, the capacitance of one capacitor increasing if the capacitance of the other capacitor decreases.

Furthermore, additional electrodes 10 are provided for a self-testing. The additional electrodes 10 are likewise suspended on bearing blocks 5. The additional electrodes 10 may be arranged opposite the movable electrodes 3 or the bending elements 6. In both cases, capacitors are formed with the seismic mass 2. By way of example, also shown is an evaluation circuit 9 which is connected by conductor leads 8 to the bearing blocks 5. Such conductor leads are provided to all of the fixed electrodes 4a and 4b to all of the further electrodes 10, and to the seismic mass 2.

FIG. 2 shows a cross section through the sensor of FIG. 1 along the line II—II. As can be seen, the seismic mass 2 is spaced from the substrate 1 so that a deflection of the seismic mass 2 is made possible by a simple flexing of the bending elements 6 without this being impeded by friction with the substrate 1. The further electrodes 10, which are suspended on the bearing blocks 5, can furthermore be seen. The bearing blocks 5 are arranged on an insulating layer 7 so that the bearing blocks 5, and consequently also the electrodes 4, 10 suspended thereon and the seismic mass 2 suspended thereon, are mutually insulated.

The substrate 1 is composed of monocrystalline silicon. The seismic mass 2, the bearing blocks 5, the electrodes 3, 4, 10 and the bending elements 6 are composed of polycrystalline or monocrystalline silicon. As an alternative to the use of an insulating layer 7, the silicon material may also have a P-N junction with the substrate 1. Applied metal structures which are arranged on ceramic substrates or silicon substrates or the like can also be used to form the sensor.

The evaluation circuit 9 measures the acceleration which acts on the sensor. In the simplest case, this can be done by comparing the capacitances of the two differential capacitors. A substantially better method of measuring the acceleration is to use the differential capacitors for a positional control of the seismic mass. For this purpose, electrical voltages are applied to the fixed electrodes in such a way that the seismic mass remains in a position which corresponds to the rest position, i.e. the position without the action of an acceleration. The electrical voltages required to control the position of the seismic mass 2 are then a measure of the acceleration. The positional control improves the measurability of the sensor signal. If an electrical voltage is likewise applied to the further electrodes 10, the electrical voltage brings about a force action on the seismic mass 2. The force action causes a deflection of the seismic mass 2 or a corresponding readjustment of the positional control of the seismic mass 2. An apparent acceleration which results in a signal at the evaluation circuit 9 can consequently be generated by applying electrical voltage to the additional electrodes 10. In this way, a functional test of the acceleration sensor and the evaluation circuit is possible without interrupting the signal path of the circuit 9.

FIG. 1 shows a multiplicity of fixed electrodes 4a, 4b and further electrodes 10. In principle, the acceleration sensor according to FIG. 1 is, however, also serviceable within the context of the present invention if only one fixed electrode and one additional electrode are provided. Any desired combinations of fixed electrodes 4a, 4b and further electrodes 10 are possible. Since only an attraction between the electrodes can be brought about by electrostatic forces, electrodes should, however, be arranged on both sides of the seismic mass in order to make possible a positional control during accelerations in any direction or a self-testing in any direction.

Figure 3:
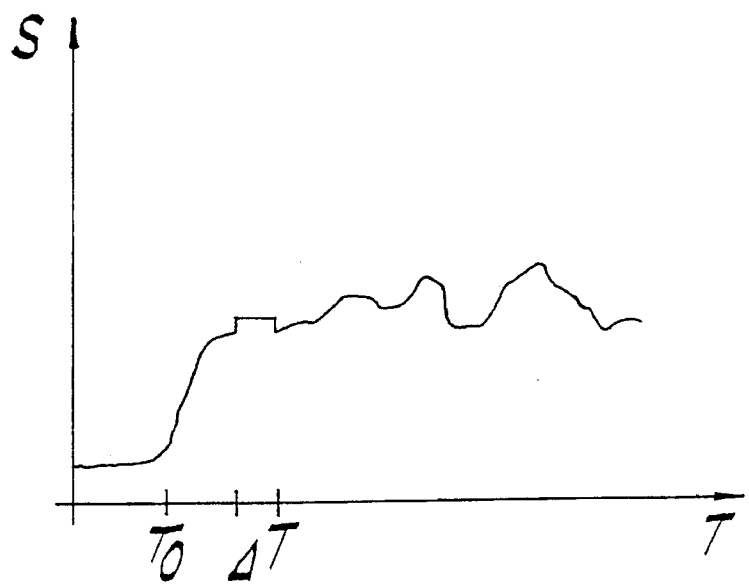
FIG. 3 shows a graph in which the sensor signal s is plotted against time t.

FIG. 3 shows a diagram in which the output signal s of the circuit 9 is plotted against time t. An acceleration takes place at the instant $t_0$, so that the output signal s increases. In order to check whether the output signal s is not indicative of a defective functioning of the sensor element or of the evaluation circuit 9, an electrical voltage is applied to one of the further electrodes 10 shown in FIG. 1 in the interval $\Delta t$. These voltages result in an alteration of the signal level, which is characterized by a particularly steep signal edge, in particular, at the start and end of the interval $\Delta t$. The serviceability of the sensor element or of the evaluation circuit 9 can therefore be checked by evaluating the variation with time, in particular by detecting the steep edges at the start or at the end of the time interval $\Delta t$ and/or the height of the edges.

Such a self-testing method is particularly advantageous in the case of sensors which are used for safety components such as, for example, an air bag triggering device. Furthermore, the principle shown here of using additional electrodes 10 can also be used in a sensor whose actual sensor signal is generated from a differential capacitor. Such sensors also make it possible to use a positional control, which improves the measurability of the sensor signal.

Figure 4:
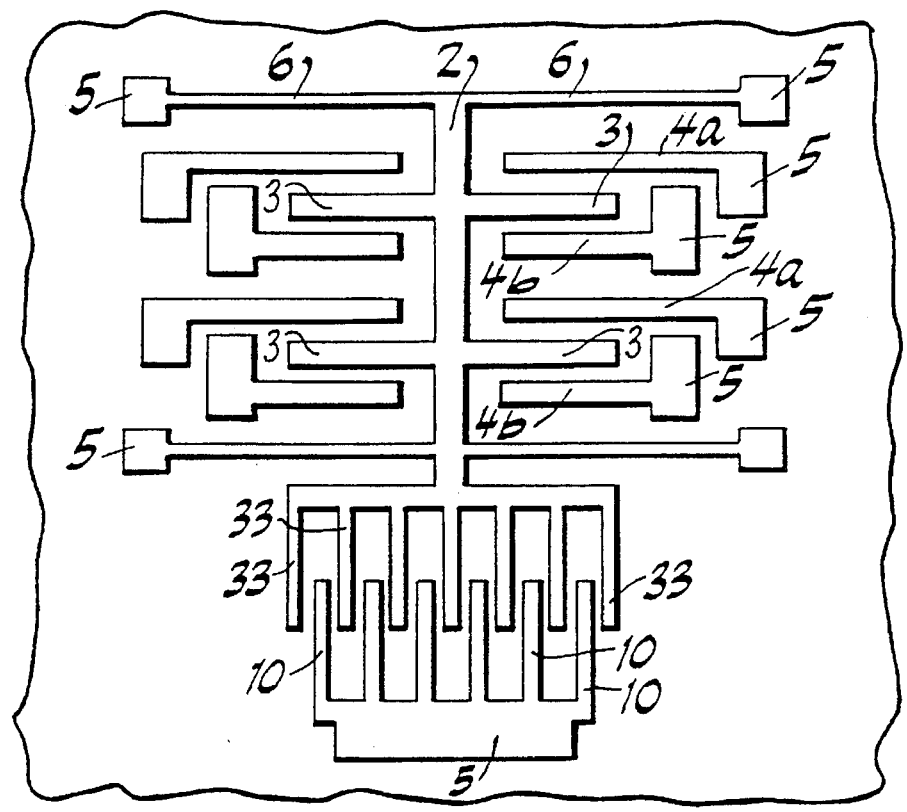
FIG. 4 shows a further exemplary embodiment of a sensor according to the present invention.

FIG. 4 shows a further exemplary embodiment of the sensor according to the present invention. Elements having the same function are again provided with the same reference numerals. In contrast to FIG. 1, additional electrodes 10 are provided here which are designed as comb-shaped fingers which mesh with the movable electrodes 33 which are of corresponding comb-shaped design. The additional electrodes 10 therefore form capacitors with the movable electrodes 33. In contrast to FIG. 1, however, the capacitance is altered here not by an alteration of the plate spacing, but by an alteration of the overlap area of the two electrodes. In such capacitors, the force action on the seismic mass is a linear function of the applied electrical potential, which simplifies the control of the corresponding potentials.

What is claimed is:

1. A capacitive acceleration sensor comprising:
   at least one movable seismic mass adapted to be deflected by an acceleration, the seismic mass including at least one movable electrode;
   at least one fixed electrode arranged opposite the movable electrode, the fixed electrode and the movable electrode forming at least one measuring capacitance; and
   at least one further fixed electrode adapted to receive an electrical voltage, a force being exerted on the seismic mass in response to the electrical voltage.

2. The capacitive acceleration sensor according to claim 1, further comprising an evaluation circuit for applying the electric voltage to the at least one fixed electrode.

3. The capacitive acceleration sensor according to claim 1, further comprising:
   a plate-like substrate;
   a plurality of bearing blocks anchored on the substrate, at least one of the bearing blocks being connected to the fixed electrode; and
   at least one bending element connected to the seismic mass and to at least one of the bearing blocks.

4. The capacitive acceleration sensor according to claim 1, wherein the further fixed electrode is arranged opposite the movable electrode, and the further fixed electrode and the movable electrode form at least one plate capacitor.

5. The capacitive acceleration sensor according to claim 4, wherein the further fixed electrode and the movable electrode define a space therebetween, the space changing as a function of the acceleration of the seismic mass.

6. The capacitive acceleration sensor according to claim 4, wherein the further fixed electrode and the movable electrode define an overlap, the overlap changing as a function of the acceleration of the seismic mass.

7. The capacitive acceleration sensor according to claim 3, wherein the further fixed electrode is arranged opposite the bending element, and the further fixed electrode and the bending element form at least one plate capacitor.

8. The capacitive acceleration sensor according to claim 1, wherein the at least one fixed electrode includes two fixed electrodes, the movable electrode is arranged between the two fixed electrodes, and the movable electrode and the two fixed electrodes form at least two measuring capacitances.

9. The capacitive acceleration sensor according to claim 3, wherein each of the seismic mass, the bending element, the bearing blocks, the fixed electrode and the further fixed electrode is composed of at least one of silicon and metal.

10. A method of operating a capacitive acceleration sensor, the capacitive acceleration sensor having
   at least one movable seismic mass adapted to be deflected by an acceleration, the seismic mass having at least one movable electrode,
   at least one fixed electrode arranged opposite the movable electrode, the fixed electrode and the movable electrode forming at least one measuring capacitor,
   at least one further fixed electrode adapted to receive an electrical voltage, a force being exerted on the seismic mass in response to the electrical voltage, and
   an evaluation circuit coupled to the fixed electrode,
   the method comprising the steps of:
   applying a test signal to the further fixed electrode; and
   checking a signal of the evaluation circuit for a response to the test signal.

* * * * *

UNITED STATES PATENT AND TRADEMARK OFFICE
CERTIFICATE OF CORRECTION

PATENT No.   : 5,618,989

DATED   : April 8, 1997

INVENTOR(S)   : Jiri Marek

It is certified that error appears in the above-identified patent and that said Letters Patent is hereby corrected as shown below:

Column 3, line 26, "At" should be -- $\Delta t$ --.

Signed and Sealed this

Sixteenth Day of December, 1997

*Attest:*

BRUCE LEHMAN

*Attesting Officer*   Commissioner of Patents and Trademarks